(12) United States Patent
Snyder

(10) Patent No.: US 6,584,639 B1
(45) Date of Patent: Jul. 1, 2003

(54) FUEL SQUEEGEE

(76) Inventor: Larry L. Snyder, 3207 Ashworth Rd., Waukee, IA (US) 50263

(*) Notice: Subject to any disclaimer, the term of this patent is extended or adjusted under 35 U.S.C. 154(b) by 4 days.

(21) Appl. No.: 09/835,973

(22) Filed: Apr. 17, 2001

(51) Int. Cl.7 .............................................. F01M 11/12
(52) U.S. Cl. ...................... 15/220.4; 15/104.04; 33/725
(58) Field of Search ........................... 15/104.04, 210.1, 15/220.4; 33/722, 725

(56) References Cited

U.S. PATENT DOCUMENTS

| | | | |
|---|---|---|---|
| 1,164,156 A | * | 12/1915 | Yeager |
| 2,147,250 A | * | 2/1939 | Freeman |
| 2,457,128 A | * | 12/1948 | Churnell |
| 2,666,621 A | * | 1/1954 | Hunt |
| 3,902,215 A | * | 9/1975 | Waldrop et al. |
| 4,233,704 A | | 11/1980 | Sartorio |
| 4,282,624 A | | 8/1981 | Cobb |
| 4,716,615 A | | 1/1988 | Whitehead et al. |
| 4,891,859 A | | 1/1990 | Tremblay |
| 5,598,602 A | | 2/1997 | Gibson |

\* cited by examiner

*Primary Examiner*—Terrence R. Till
(74) *Attorney, Agent, or Firm*—Camille L. Urban; G. Brian Pingel

(57) ABSTRACT

The dipstick fuel squeegee of the present invention includes an elongated, rigid but lightweight base with foot pegs on either end and is long enough to span the opening of most large tanks. The base has a midsection into which first a wiper member and then a securing member are releaseably attached. There are openings in the midsection, the wiper member, and the securing member which are vertically aligned. The openings of the midsection and the securing member are approximately equal in size while the opening in the wiper element is smaller. The wiper element is made of a flexible, resilient material and substantially centered over the opening in the seat. During use, a dipstick is inserted through the three openings of the squeegee, the user secures the squeegee by standing on the foot pegs, and the wiper member dislodges any liquid adhering to the dipstick as the user raises it through the squeegee.

7 Claims, 3 Drawing Sheets

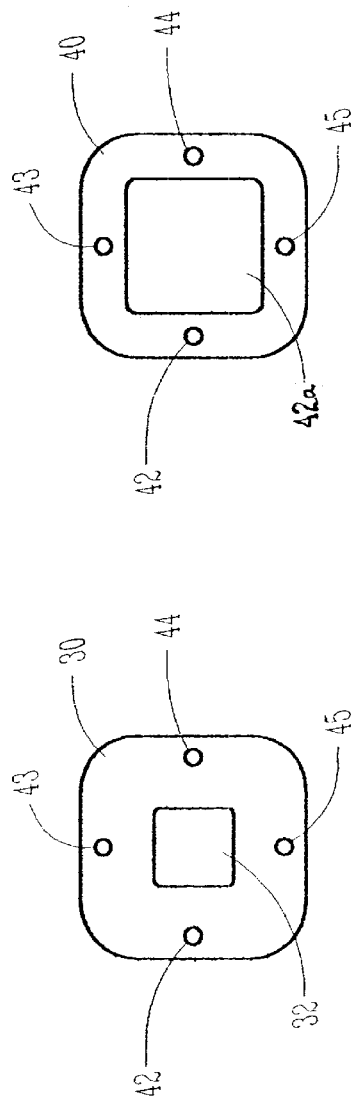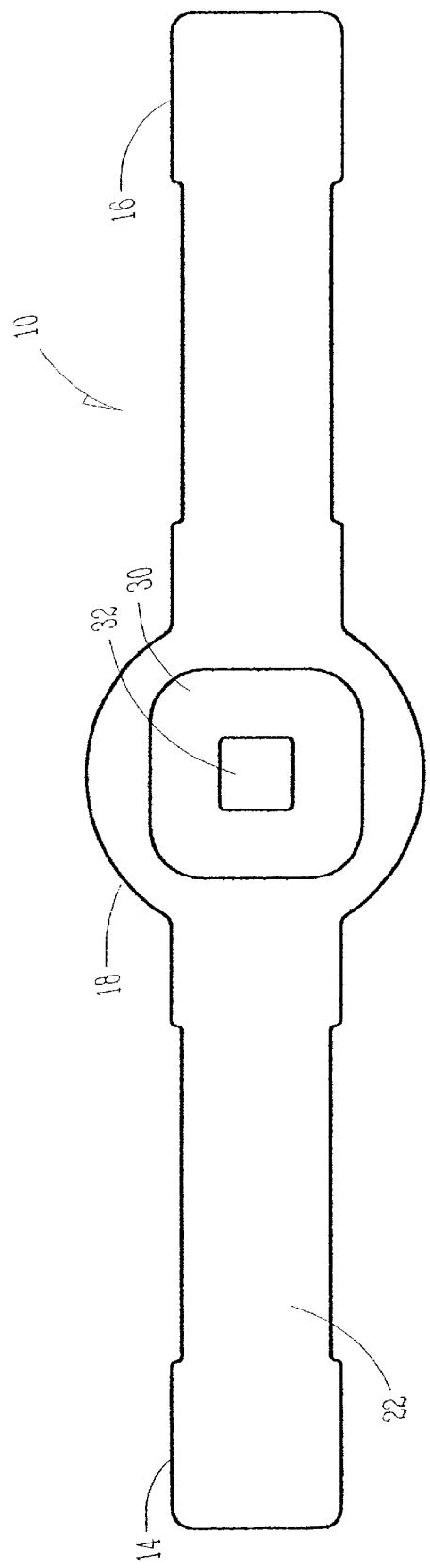

FUEL SQUEEGEE

BACKGROUND OF THE INVENTION

1. Field of the Invention

The present invention relates generally to a device used for measuring fluid level in a large container or tank and, more particularly, to devices used to remove any fluid remaining on the measuring device.

2. Description of the Prior Art

The storage of oil, gasoline or other liquids in large tanks is commonplace. Many of these tanks are buried underground and many do not have fluid level gauges. Therefore, to determine the amount of fluid left in a tank one end of a "dipstick" is inserted into the top of the tank until it reaches the bottom of the tank at which point the stick is withdrawn. At least some of the fluid in the tank adheres to the stick. The level of fluid in the tank is determined according to the height on the stick to which the liquid adhered. Then the fluid must somehow be removed from the stick in order to avoid staining the stick, creating a mess, and, more importantly, to substantially eliminate both fire and environmental hazards which might otherwise result.

In the past, rags have been used to clean these dipsticks and are still used by many today. However, the oil or gas soaked rags pose environmental and fire hazards and their disposal can be problematic. In addition, the purchase of these rags when used in conjunction with frequently measured and large tanks can be expensive.

Devices have been designed to assist in the cleaning of dipsticks although most are specifically intended to be used to check oil levels in combustion engines rather than liquid levels in large tanks. To that end, there are hand-held devices which operate similarly to tongs such that a cleaning pad is mounted on each jaw of the tongs. To clean the dipstick the tongs are opened and the dipstick positioned between the jaws; then the tongs are closed and the stick drawn upwardly. Liquid is removed from the dipstick by the cleaning pads. (See U.S. Pat. No. 4,233,704). Others simply provide a slit in a flexible cleansing material into which the dipstick is slid and then drawn upward.

A number of dipstick squeegees (more particularly designed for engine oil checking) are constructed such that they are attached to the dipstick tube or otherwise mounted on the engine. For example, see U.S. Pat. No. 5,598,602 which employs a squeegee device mounted on the engine which includes a swing arm. The arm is swung into position so that the dipstick can be placed between two sides upon each of which is mounted a disposable cleaning pad. The sides are then squeezed together while the stick is drawn upwards and the liquid removed. The same general idea without the swing arm is disclosed by U.S. Pat. No. 4,716,615 where the device is mounted onto a dipstick receiving tube.

Another example is disclosed by U.S. Pat. No. 4,891,859. Here again the device is mounted on the engine compartment and includes a semi-circular vertical channel with two pairs of vertically spaced resilient flaps inside. The dipstick is moved into the open side of the semicircular channel and between the flaps and drawn upward to remove liquid.

None of these inventions is easily or effectively adaptable to use for measuring liquid levels in large tanks which store, for example, gas or oil. These tanks are often filled though the same opening as their levels are checked which means that the dipstick is not resident there when not in use. Therefore, those prior inventions which combine the stick with a device intended to remain mounted on the tank could create an obstacle to efficiently filling the tank.

There are a few ideas adapted to use for the large-scale tanks. For example U.S. Pat. No. 4,282,624 discloses a device which is attached to the collar or opening of the tank and includes a rubber plat with a slit which is protected on at least three sides by a metal plate. This device is resident with the tank. The slit design is relatively short lived as many of these dipsticks are of cross-section dimensions which do not fit particularly well into the slit. If the slit is widened, parts of the stick will not be contacted leaving fluid on the stick.

These large tanks are often filled and levels consequently checked by drivers of tanker trucks. The oil or gas or other liquid remaining on a dipstick when checking tanks of this size is, of course, much greater in volume than that on a car engine's dipstick. Therefore the number of rags and the environmental hazards they pose are increased exponentially. It is not reasonable, then, to use any prior inventions wherein absorbent pads are employed. Additionally, the drivers of tanker trucks may deliver at a number of different places so they need a squeegee that is light, transportable, and durable with a wiping surface that is also relatively durable but also easily replaceable when worn. They cannot depend on the places to which they deliver to maintain or even have an efficient squeegee device. The squeegee must be at chemically resistant to erosion and sturdy enough to withstand use with dipsticks up to ten feet long and 1 to 3 square inches in cross section. Because of the sheer size of these dipsticks, a handheld squeegee is not practical; one must be able to maneuver the stick which typically requires both hands.

What is needed is a light and easily transportable, but durable squeegee device which deposits fluid adhering to the dipstick back into the tank. It is desirable to avoid absorbent pads and their consequential environmental and fire hazards and design instead a squeegee that includes a durable surface to remove the liquid which surface can be simply and easily replaced as needed. Although the device needs to be easily transportable and storable, it must also be of a size and construction to survive the rigors of being used with large dipsticks. Finally, while light and transportable, the squeegee needs to be constructed for hands-free use due to the sheer size of the dipsticks which need to be maneuvered at the same time and resistant to chemical erosion by gasoline and oil products.

SUMMARY

The present invention addresses the aforementioned needs by using a simple design which includes an elongated, rigid but lightweight base with foot pegs on either end of a length sufficient to span the fill opening of most large tanks. The base has a midsection which is constructed to comprise a seat or collar with an opening in it. A wiper element is fitted into the seat in the midsection and it also has an opening. The opening in the wiper element is smaller and substantially centered over the opening in the seat. Said wiper member is made of flexible material and is held in place by a securing member. This securing member is of similar size and shape to the wiper element, but constructed of rigid material and with an opening equal in size and position to the opening in the midsection. The wiper element and securing element are releaseably secured to the seat in the midsection of the base so that the wiper element can be easily replaced when it becomes worn.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 3 is a top plan view of the wiping member of FIG. 1;

FIG. 4 is a top plan view of the securing member of FIG. 1;

FIG. 5 is a bottom plan view of the invention of FIG. 1;

DESCRIPTION OF THE PREFERRED EMBODIMENT(S)

Figure 1:
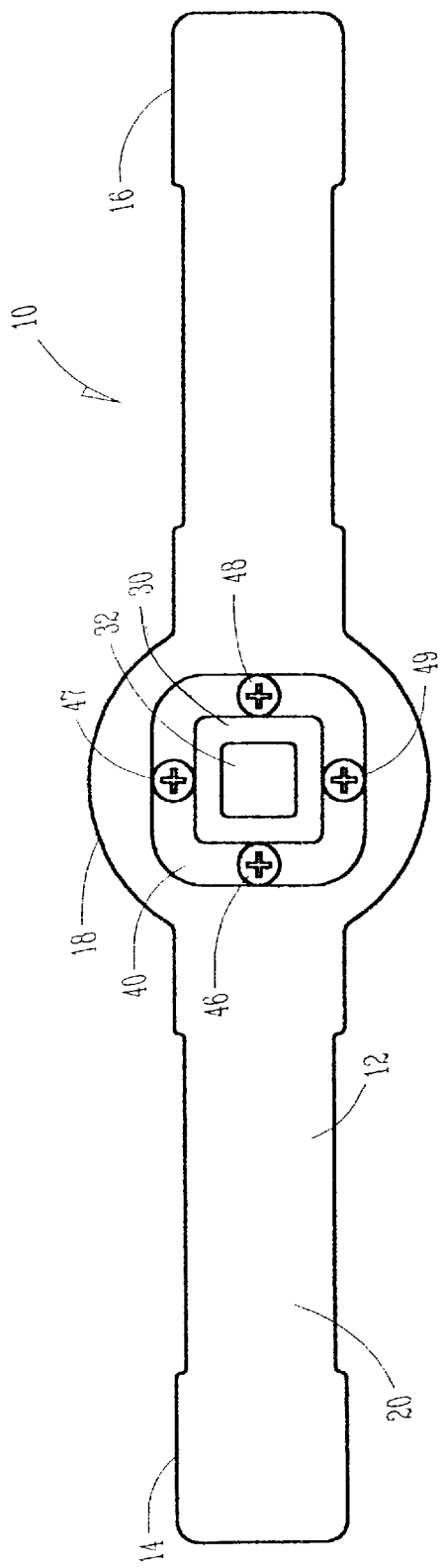
FIG. 1 is a top plan view of a preferred embodiment of the present invention showing a base, a wiping member, and a securing element assembled.
Figure 2:
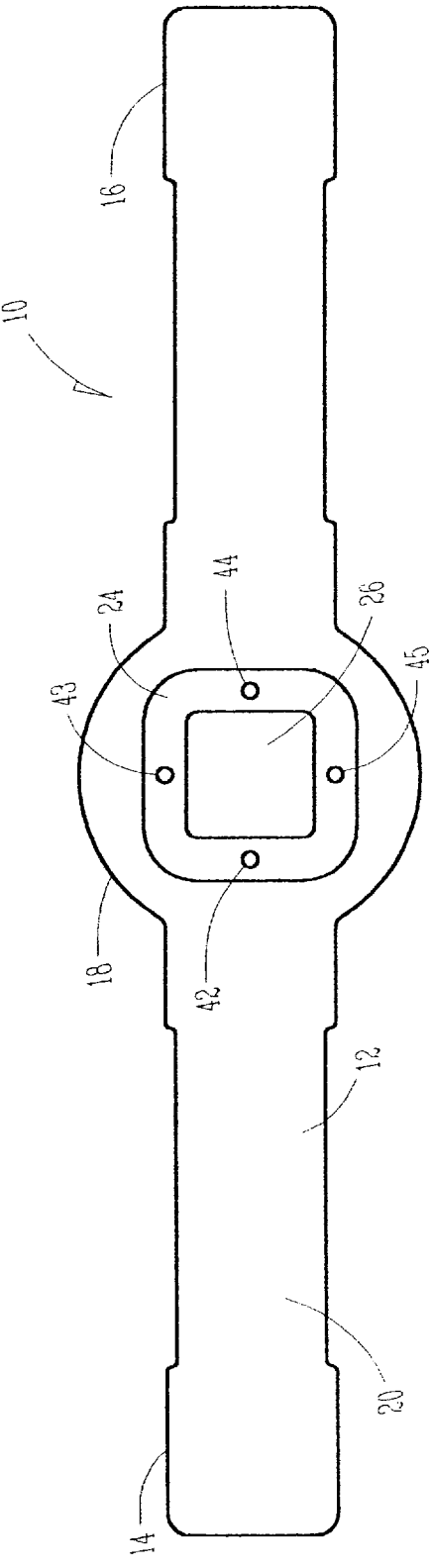
FIG. 2 is a top plan view of the base of FIG. 1.

Shown generally in FIG. 1 as 10 is the dipstick squeegee which is a preferred embodiment of the present invention. It includes an elongated base 12 with foot pegs 14 and 16 and a midsection 18 which has a top surface 20 and a bottom surface 22 (shown only in FIG. 5). Referring now to FIG. 2., a seat 24 is formed in the top surface 20 of the midsection 18 and includes a first opening 26.

A wiping member 30 shown in FIG. 3 is of equal or nearly equal size and shape as said seat 24 and has a second opening 32. However, this opening 32 is smaller than said first opening 26 in said midsection 18. The two openings 26 and 32 are vertically aligned with one another when assembled as shown in FIG. 1.

A securing member 40 shown in FIGS. 1 and 4 is of equal or nearly equal size and shape as the seat 24 and has a third opening 42a which is of approximately the same size and shape as said first opening 26 in said midsection 18. When the squeegee 10 is assembled as shown in FIG. 1, the three openings 26, 32, and 42 are vertically aligned with one another.

Figure 6:
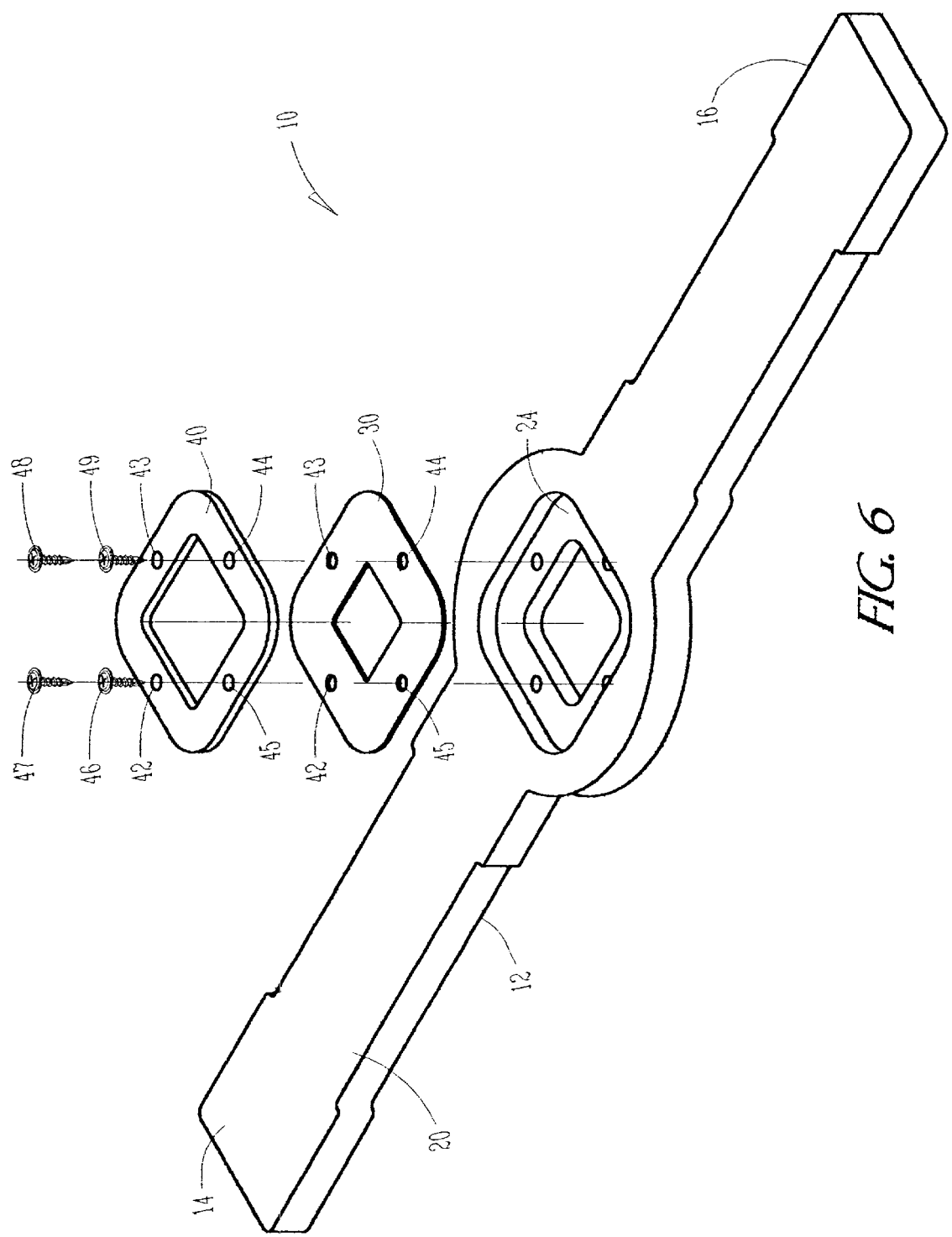
FIG. 6 is an exploded view of the elements of the present invention.

Referring now to FIG. 6, means to secure said wiper element 30 and said securing member 40 to said seat 24 are provided. In the preferred embodiment said means comprise apertures 42–45 in said wiper element 30, said securing member 40, and said seat 24 and screws 46–49. The apertures 42–45 in the seat 24, the wiper element 30 and the securing member 40 are vertically aligned with one another and then screws 46–49 are threaded through said apertures until secured.

In the preferred embodiment, the base and the securing member are constructed of very light, durable and generally rigid material such as ABS plastic or a substance more resistant to reaction with oil or gasoline products such as a polypropylene. The wiper element is of a more flexible yet still durable material.

In use, a dipstick is lowered through an opening into a tank and raised to check the fluid level. At this point, the top end of the dipstick is inserted through the openings 26, 32, and 42a. After the level is read and recorded, the squeegee 10 is moved down the dipstick to span the opening in the tank, the user places at least one foot on a foot peg 14 or 16, and the dipstick is raised up and through the openings 26, 32, and 42a. The wiping member 30 removes liquid from the dipstick as the stick is raised.

After a number of uses, it may become necessary to replace the wiping member 30. This is easily accomplished by removing screws 46–49, lifting off the securing member 40 and the wiper member 30 and replacing said wiper member 30 with another and reversing the process.

Thus, the present invention has been described in an illustrative manner. It is to be understood that the terminology that has been used is intended to be in the nature of words of description rather than of limitation.

Many modifications and variations of the present invention are possible in light of the above teachings. For example, securing means could comprise clamps or pins with fasteners. Therefore, within the scope of the appended claims, the present invention may be practiced otherwise than as specifically described.

What I claim is:

1. A dipstick squeegee comprising:
    a) a base constructed of a generally rigid but light material with a midsection;
    b) foot pegs associated with said base;
    c) a seat in said midsection with a first opening and a plurality of apertures;
    d) a wiping member of dimension approximately equal to that of said seat and made of flexible resilient material;
    e) said wiping member further comprising a second opening and a plurality of apertures;
    f) a securing member of approximately equal dimension to said seat and made of a generally rigid but light material said securing member further comprising a third opening, and a plurality of apertures; and
    g) a plurality of pin-like members.

2. A dipstick squeegee as claimed in claim 1 wherein said first and third openings are approximately equal in size, said second opening is smaller than said first and third openings, and all three openings are vertically aligned with each other.

3. A dipstick squeegee as claimed in claim 2 wherein said wiping member is placed in said seat and said securing member is placed on top of said wiping member in said seat such that said pluralities of apertures are aligned and said pin-like members are inserted through said apertures to secure said base, said wiping member, and said securing member together.

4. A dipstick squeegee comprising:
    a) a base further comprising at least one foot peg and a midsection with a first opening;
    b) a wiping member with a second opening;
    c) a securing member with a third opening;
    d) a means to secure said wiping element and said securing member to said midsection such that said first, second, and third openings are vertically aligned;
    e) said midsection of said base further comprising a seat; and
    f) said wiping member and said securing member are of nearly equal dimensions as said seat.

5. A dipstick squeegee as claimed in claim 4 wherein said first opening and said third opening are of generally equal dimensions.

6. A dipstick squeegee as claimed in claim 5 wherein said second opening is smaller than said first and third openings.

7. A dipstick squeegee as claimed in claim 4 wherein said base is elongated and further comprises ends on either side of said midsection said ends being substantially flat and somewhat flared to form said foot pegs.

* * * * *